United States Patent
Gao et al.

(10) Patent No.: US 11,251,714 B1
(45) Date of Patent: Feb. 15, 2022

(54) METHOD, APPARATUS AND SYSTEM FOR IMPROVING ENERGY TRANSMISSION EFFICIENCY BETWEEN BATTERY AND POWER GRID

(71) Applicant: Contemporary Amperex Technology Co., Limited, Ningde (CN)

(72) Inventors: Jinfeng Gao, Ningde (CN); Zhimin Dan, Ningde (CN); Yizhen Hou, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/490,149

(22) Filed: Sep. 30, 2021

Related U.S. Application Data

(63) Continuation of application No. PCT/CN2020/135043, filed on Dec. 19, 2020.

(51) Int. Cl.
   *H02M 3/335* (2006.01)
   *H02J 7/00* (2006.01)
   *H02M 1/00* (2006.01)
   *H02J 3/32* (2006.01)

(52) U.S. Cl.
   CPC ........... *H02M 3/33584* (2013.01); *H02J 3/32* (2013.01); *H02J 7/00712* (2020.01); *H02M 1/007* (2021.05); *H02M 3/33573* (2021.05); *H02M 3/33576* (2013.01); *H02J 2207/20* (2020.01)

(58) Field of Classification Search
   CPC .. H02M 3/33584; H02M 7/219; H02M 7/797; H02M 1/007; H02M 3/33573; H02M 3/33576; H02J 3/32; H02J 7/00712; H02J 2207/20; B60L 53/22; B60L 55/00
   See application file for complete search history.

(56) References Cited

U.S. PATENT DOCUMENTS

| | | | | |
|---|---|---|---|---|
| 10,493,853 | B2* | 12/2019 | Widmer | H04B 5/0037 |
| 10,696,182 | B2* | 6/2020 | Khaligh | H02M 1/4258 |
| 11,021,069 | B1* | 6/2021 | Elshaer | H02M 3/33584 |
| 11,183,847 | B2* | 11/2021 | Gohla-Neudecker | B60L 53/66 |

(Continued)

FOREIGN PATENT DOCUMENTS

| CN | 1738171 A | 2/2006 |
|---|---|---|
| CN | 103155335 A | 6/2013 |

(Continued)

OTHER PUBLICATIONS

The International search report for PCT Application No. PCT/CN2020/135043, dated Aug. 27, 2021, 11 pages.

(Continued)

*Primary Examiner* — Yusef A Ahmed
(74) *Attorney, Agent, or Firm* — Law Offices of Liaoteng Wang

(57) ABSTRACT

The application provides a method for controlling a power converter, in which a theoretical output voltage of a first converter is acquired according to a voltage of a source side, a theoretical input voltage of a second converter is acquired according to a voltage of a destination side, and an actual output voltage of the first converter in a first power supply cycle is set according to the theoretical output voltage of the first converter and the theoretical input voltage of the second converter.

13 Claims, 7 Drawing Sheets

(56) References Cited

U.S. PATENT DOCUMENTS

| | | | |
|---|---|---|---|
| 2012/0047386 A1* | 2/2012 | Matsui | H02J 7/35 713/340 |
| 2013/0039104 A1* | 2/2013 | Sharma | H02M 3/33584 363/123 |
| 2013/0207482 A1* | 8/2013 | Madawala | H02J 50/12 307/104 |
| 2015/0001958 A1* | 1/2015 | Abe | B60L 15/007 307/104 |
| 2015/0115906 A1* | 4/2015 | Ebisu | H02M 5/293 323/217 |
| 2015/0207335 A1* | 7/2015 | Madawala | B60L 55/00 307/104 |
| 2015/0309123 A1* | 10/2015 | Berroteran Gil | G01R 31/40 324/764.01 |
| 2016/0016479 A1* | 1/2016 | Khaligh | H01F 38/08 363/17 |
| 2016/0126750 A1* | 5/2016 | Yasuda | H02J 7/0042 307/104 |
| 2016/0181944 A1* | 6/2016 | James | B60L 53/22 363/17 |
| 2018/0062430 A1* | 3/2018 | Matsumoto | B60L 53/122 |
| 2018/0109193 A1* | 4/2018 | Hirota | H02M 7/219 |
| 2018/0229618 A1* | 8/2018 | Lee | B60L 55/00 |
| 2018/0233953 A1* | 8/2018 | Thrimawithana | H02J 50/12 |
| 2018/0257494 A1* | 9/2018 | Yang | H02J 7/04 |
| 2018/0323701 A1* | 11/2018 | Sano | H02M 7/48 |
| 2018/0334046 A1* | 11/2018 | Lee | H02M 7/44 |
| 2018/0342897 A1* | 11/2018 | Huang | B60L 53/126 |
| 2019/0149055 A1* | 5/2019 | Tomita | H02M 3/3376 363/17 |
| 2019/0168632 A1* | 6/2019 | Deng | B60L 50/64 |
| 2020/0195037 A1* | 6/2020 | Woo | B60L 53/62 |
| 2020/0195129 A1* | 6/2020 | Woo | H02J 7/022 |
| 2020/0369168 A1* | 11/2020 | Barker | G01R 31/382 |
| 2021/0028712 A1* | 1/2021 | Yu | H01F 38/38 |
| 2021/0155100 A1* | 5/2021 | Khaligh | B60L 53/22 |
| 2021/0188106 A1* | 6/2021 | Asa | H02J 7/0047 |
| 2021/0312877 A1* | 10/2021 | He | G09G 3/20 |
| 2021/0313870 A1* | 10/2021 | Iwabuki | H02M 1/0048 |

FOREIGN PATENT DOCUMENTS

| | | |
|---|---|---|
| CN | 205693374 U | 11/2016 |
| CN | 206452173 U | 8/2017 |
| CN | 109729715 A | 5/2019 |
| CN | 110768550 A | 2/2020 |
| CN | 210478445 U | 5/2020 |
| CN | 112234640 A | 1/2021 |
| CN | 113162084 A | 7/2021 |
| JP | 2017085839 A | 5/2017 |

OTHER PUBLICATIONS

The First Office Action for China Application No. 202011433037.5, dated Jan. 26, 2021, 7 pages.

Chen Xiaohu et al. Research and design of electric vehicle charger based on dspic33e Electronic devices Nov. 4, 2016(Nov. 4, 2016) The fifth issue,vol. 39.,pp. 1209-1214, 6 pages.

\* cited by examiner

METHOD, APPARATUS AND SYSTEM FOR IMPROVING ENERGY TRANSMISSION EFFICIENCY BETWEEN BATTERY AND POWER GRID

CROSS REFERENCE TO RELATED APPLICATIONS

The present application is a continuation of International Application No. PCT/CN2020/135043, filed on Dec. 9, 2020, the contents of which are hereby incorporated by reference in its entirety.

TECHNICAL FIELD

The application relates to the technical field of power technology, in particular to a method, apparatus and system for controlling a power converter.

BACKGROUND

Renewable energy (such as solar energy, wind energy, etc.) is being widely connected into a power system. As discontinuity of the renewable energy will cause fluctuations of power generation, it is required to use other energy (such as a battery power storage system) as a supplement so as to smooth variability of the renewable energy and thus ensure frequency stability of a power grid and restrain a voltage rise caused by a reverse power flow.

Plug-in hybrid electric vehicles and pure electric vehicles will become an integral part of a power distribution system itself. As these electric vehicles are equipped with large-capacity batteries, when the electric vehicles in a stopped state are connected to the power grid, the electric vehicles may be used as removable distributed power storage devices, which can provide remaining electric energy to the power grid under a premise of meeting needs of a user for driving the electric vehicles. Vehicle-to-Grid (V2G) technology and Grid-to-Vehicle (G2V) technology realize two-way interaction between the power grid and the electric vehicles, which is an important part of smart grid technology.

When a load of the power grid is too high, electricity is supplied by the batteries of the electric vehicles to the power grid through a power converter. When the load of the power grid is too low, electricity is supplied by the power grid to the batteries of the electric vehicles through the power converter. It is a problem to be solved to improve V2G energy transmission efficiency.

SUMMARY

The application provides a method, apparatus and storage medium for controlling a power converter, which can improve energy transmission efficiency between a battery of a vehicle and a power grid.

In a first aspect, embodiments of the application provide a method for controlling a power converter, the method comprising: acquiring a theoretical output voltage of a first converter according to a voltage of a source side, wherein the source side is one of a battery and a power grid; acquiring a theoretical input voltage of a second converter according to a voltage of a destination side, wherein the destination side is the other of the battery and the power grid and the source side transmits electric energy to the destination side through the first converter and the second converter in turn; and setting an actual output voltage of the first converter in a first power supply cycle according to the theoretical output voltage of the first converter and the theoretical input voltage of the second converter, wherein the first power supply cycle is a current cycle in which the source side transmits electric energy to the destination side.

In a realizable implementation, the source side is the battery and the destination side is the power grid, and the setting an actual output voltage of the first converter in a first power supply cycle according to the theoretical output voltage of the first converter and the theoretical input voltage of the second converter comprises: under a condition that a larger value of the theoretical output voltage of the first converter and the theoretical input voltage of the second converter is larger than a minimum operating voltage of the second converter and less than a maximum withstand voltage of the first converter and the second converter, setting the larger value as the actual output voltage of the first converter in the first power supply cycle.

In a realizable implementation, the setting an actual output voltage of the first converter in a first power supply cycle according to the theoretical output voltage of the first converter and the theoretical input voltage of the second converter comprises: if the larger value of the theoretical output voltage of the first converter and the theoretical input voltage of the second converter is larger than the minimum operating voltage of the second converter and less than the maximum withstand voltage of the first converter and the second converter, and an absolute value of a difference between the larger value and an actual output voltage of the first converter in a second power supply cycle is less than or equal to a first voltage threshold, setting the larger value as the actual output voltage of the first converter in the first power supply cycle, wherein the second power supply cycle is a previous cycle of the first power supply cycle.

In a realizable implementation, the setting an actual output voltage of the first converter in a first power supply cycle according to the theoretical output voltage of the first converter and the theoretical input voltage of the second converter comprises: if the larger value of the theoretical output voltage of the first converter and the theoretical input voltage of the second converter is larger than the minimum operating voltage of the second converter and less than the maximum withstand voltage of the first converter and the second converter, and an absolute value of a difference between the larger value and an actual output voltage of the first converter in a second power supply cycle is larger than a first voltage threshold, setting the actual output voltage of the first converter in the first power supply cycle according to the actual output voltage of the first converter in the second power supply cycle and the first voltage threshold, wherein the second power supply cycle is a previous cycle of the first power supply cycle.

In a realizable implementation, the setting an actual output voltage of the first converter in a first power supply cycle according to the theoretical output voltage of the first converter and the theoretical input voltage of the second converter comprises: if the larger value of the theoretical output voltage of the first converter and the theoretical input voltage of the second converter is less than or equal to the minimum operating voltage of the second converter, setting the minimum operating voltage of the second converter as the actual output voltage of the first converter in the first power supply cycle.

In a realizable implementation, the setting an actual output voltage of the first converter in a first power supply cycle according to the theoretical output voltage of the first converter and the theoretical input voltage of the second converter comprises: if the larger value of the theoretical output voltage of the first converter and the theoretical input voltage of the second converter is larger than or equal to the maximum withstand voltage of the first converter and the second converter, setting the maximum withstand voltage of the first converter and the second converter as the actual output voltage of the first converter in the first power supply cycle.

In a realizable implementation, the source side is the power grid and the destination side is the battery, and the setting an actual output voltage of the first converter in a first power supply cycle according to the theoretical output voltage of the first converter and the theoretical input voltage of the second converter comprises: if a larger value of the theoretical output voltage of the first converter and the theoretical input voltage of the second converter is larger than a minimum operating voltage of the first converter and less than a maximum withstand voltage of the first converter and the second converter, setting the larger value as the actual output voltage of the first converter in the first power supply cycle.

In a realizable implementation, the setting an actual output voltage of the first converter in a first power supply cycle according to the theoretical output voltage of the first converter and the theoretical input voltage of the second converter comprises: if the larger value of the theoretical output voltage of the first converter and the theoretical input voltage of the second converter is larger than the minimum operating voltage of the first converter and less than the maximum withstand voltage of the first converter and the second converter, and an absolute value of a difference between the larger value and an actual output voltage of the first converter in a second power supply cycle is less than or equal to a second voltage threshold, setting the larger value as the actual output voltage of the first converter in the first power supply cycle, wherein the second power supply cycle is a previous cycle of the first power supply cycle.

In a realizable implementation, the setting an actual output voltage of the first converter in a first power supply cycle according to the theoretical output voltage of the first converter and the theoretical input voltage of the second converter comprises: if the larger value of the theoretical output voltage of the first converter and the theoretical input voltage of the second converter is larger than the minimum operating voltage of the first converter and less than the maximum withstand voltage of the first converter and the second converter, and an absolute value of a difference between the larger value and an actual output voltage of the first converter in a second power supply cycle is larger than a second voltage threshold, setting the actual output voltage of the first converter in the first power supply cycle according to the actual output voltage of the first converter in the second power supply cycle and the second voltage threshold, wherein the second power supply cycle is a previous cycle of the first power supply cycle.

In a realizable implementation, the setting an actual output voltage of the first converter in a first power supply cycle according to the theoretical output voltage of the first converter and the theoretical input voltage of the second converter comprises: if the larger value of the theoretical output voltage of the first converter and the theoretical input voltage of the second converter is less than or equal to the minimum operating voltage of the first converter, setting the minimum operating voltage of the first converter as the actual output voltage of the first converter in the first power supply cycle.

In a realizable implementation, the setting an actual output voltage of the first converter in a first power supply cycle according to the theoretical output voltage of the first converter and the theoretical input voltage of the second converter comprises: if the larger value of theoretical output voltage of the first converter and the theoretical input voltage of the second converter is larger than or equal to the maximum withstand voltage of the first converter and the second converter, setting the maximum withstand voltage of the first converter and the second converter as the actual output voltage of the first converter in the first power supply cycle.

In a second aspect, embodiments of the application provides an apparatus for controlling a power converter, the apparatus comprising: an acquisition unit configured for acquiring a theoretical output voltage of a first converter according to a voltage of a source side and further for acquiring a theoretical input voltage of a second converter according to a voltage of a destination side, wherein the source side is one of a battery and a power grid and the destination side is the other of the battery and the power grid and the source side transmits electric energy to the destination side through the first converter and the second converter in turn; and a processing unit configured for setting an actual output voltage of the first converter in a first power supply cycle according to the theoretical output voltage of the first converter and the theoretical input voltage of the second converter, wherein the first power supply cycle is a current cycle in which the source side transmits electric energy to the destination side.

In a third aspect, embodiments of the application provides a computer readable storage medium storing programs or instructions thereon, wherein the programs or instructions when executed by a processor, implement the methods for controlling a power converter in technical solutions of the first aspect.

Based on the theoretical output voltage of the first converter and the theoretical output voltage of the second converter, the actual output voltage of the first converter in the current cycle is adjusted in real time, so that the energy transmission efficiency between the source side and the destination side is improved.

BRIEF DESCRIPTION OF THE DRAWINGS

The drawings described herein are used to provide further understanding of the application and form a part thereof. Illustrative embodiments of the application and descriptions thereof are used to explain the application and do not constitute an improper limitation of the application.

DETAILED DESCRIPTION

Features and exemplary embodiments of various aspects of the application will be described in detail below. In the following detailed description, many specific details are presented in order to provide comprehensive understanding of the application. However, it is obvious to those skilled in the art that the application may be implemented without some of the specific details. The following description of the embodiments is only to provide better understanding of the application by presenting examples of the application. The application is by no means limited to any specific configuration and algorithm proposed below. In the accompanying drawings and the following description, well-known structures and techniques are not shown in order to avoid unnecessarily obscuring the application.

It should be noted that in the context, relational terms such as "first" and "second" and so on are only used to distinguish one entity or operation from another, and do not necessarily require or imply any actual relationship or order between these entities or operations. Moreover, terms of "including", "containing" or any other variations thereof are intended to cover non-exclusive inclusion, so that a process, method, article or device that includes a series of elements includes not only those elements, but also other elements that are not explicitly listed, or elements inherent in such process, method, article or device. Without further limitations, the elements defined by the term "including . . . " do not exclude existence of other identical elements in the process, method, article or equipment including the elements.

For convenience of illustration, V2G technology and G2V technology are collectively called two-way V2G technology.

Figure 1:
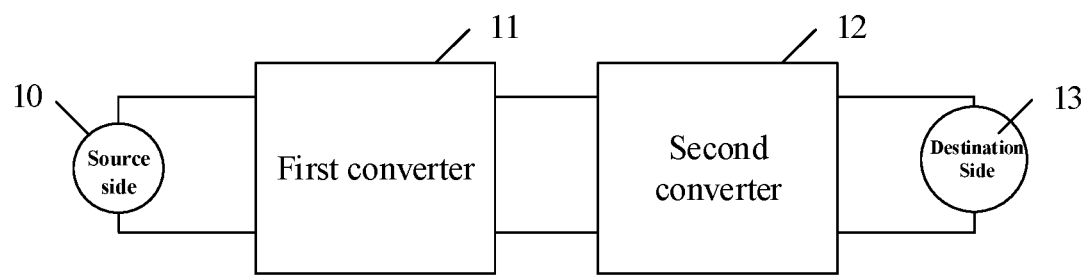
FIG. 1 illustrates a diagram of an architecture of a two-way V2G system.

FIG. 1 illustrates a diagram of an architecture of a two-way V2G system. As shown in FIG. 1, a source side 10 transmits electric energy to a destination side 13 through a first converter 11 and a second converter 12.

The first converter 11 and the second converter 12 constitute a power converter between the source side 10 and the destination side 13.

The power converter may be a two-way power converter, which can not only realize energy transmission from a battery of an electric vehicle to a power grid but also realize energy transmission from the power grid to the battery of the electric vehicle.

When the source side 10 is the battery of the electric vehicle and the destination side 13 is the power grid, the battery of the electric vehicle transmits electric energy to the power grid through the first converter 11 and the second converter 12 in turn. The first converter 11 is a DC/DC converter, and the second converter 12 is a DC/AC converter.

When the source side 10 is the power grid and the destination side is the battery of the electric vehicle, the power grid transmits electric energy to the battery of the electric vehicle through the first converter 11 and the second converter 12 in turn. The first converter 11 is an AC/DC converter and the second converter 12 is a DC/DC converter.

The battery in the embodiments of the application may be a battery cell, a battery module, a battery pack and so on in the electric vehicle, and there is no limitation here.

Figure 2:
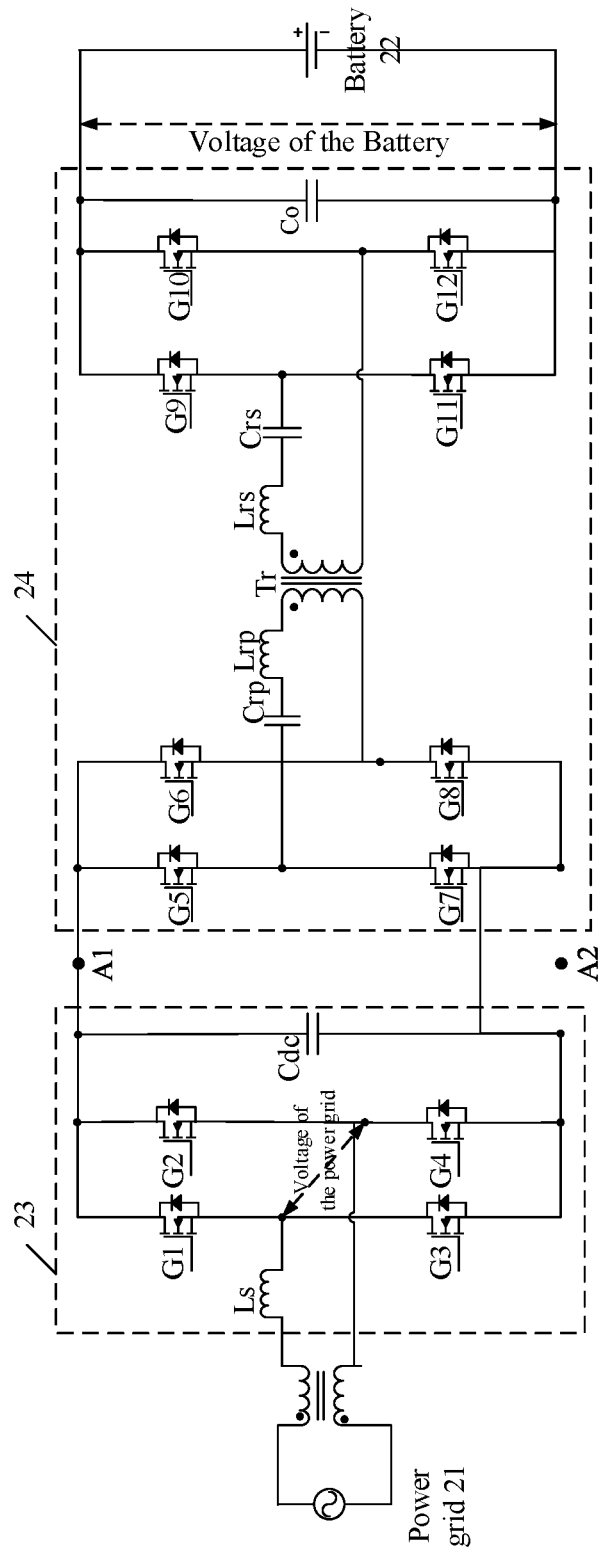
FIG. 2 illustrates a diagram of a hardware structure of a power converter.

FIG. 2 illustrates a diagram of a hardware structure of a power converter. The description is given by taking an example in which a DC/AC converter is a totem pole DC/AC converter and a DC/DC converter is an isolated resonant DC/DC converter. The DC/AC converter and the DC/DC converter in the embodiments of the application are not limited to the specific structure shown in FIG. 2.

As shown in FIG. 2, a totem pole DC/AC converter 23 includes a power switching device G1, a power switching device G2, a power switching device G3, a power switching device G4, an AC side filter inductor Ls, a bus capacitor Cdc and so on. A two-way resonant DC/DC converter 24 includes a power switching device G5, a power switching device G6, a power switching device G7, a power switching device G8, a power switching device G9, a power switching device G10, a power switching device G11, a power switching device G12, an inductor Lrp, an inductor Lrs, a capacitor Crp, a capacitor Crs, a capacitor Co, a transformer Tr and so on.

As the voltage of the power grid and the battery of the electric vehicle fluctuate in a certain range, in prior art, an actual output voltage of the first converter in a first power supply cycle is set fixedly, which reduces the energy transmission efficiency between the vehicle and the power grid.

Figure 3:
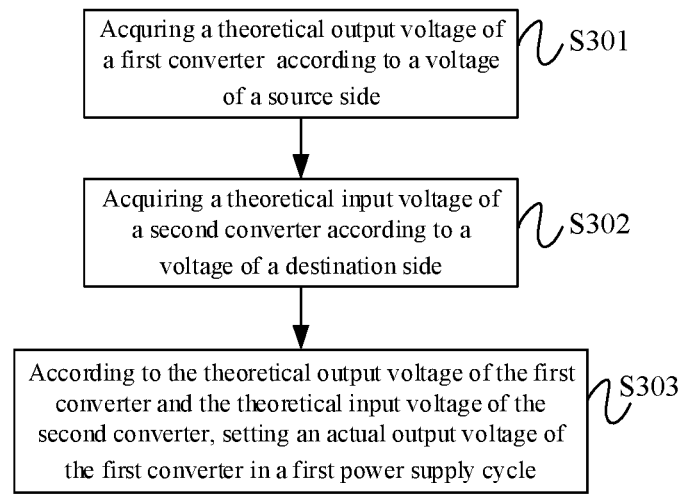
FIG. 3 illustrates a flow diagram of a method for controlling a power converter provided by embodiments of the application.

FIG. 3 illustrates a flow diagram of a method for controlling a power converter provided by an embodiment of the application. As shown in FIG. 3, the method for controlling a power converter includes the following steps. The method for controlling a power converter may be implemented by a controller, which may exist alone or be integrated into a Battery Management System (BMS) of the vehicle.

S301, a theoretical output voltage of the first converter is acquired according to a voltage of the source side, wherein the source side is one of the battery and the power grid and the destination side is the other of the battery and the power grid.

If the source side is the power grid, then the destination side is the battery. Alternatively, if the source side is the battery, then the destination side is the power grid. The source side transmits electricity energy to the destination side through the first converter and the second converter in turn.

S302, a theoretical input voltage of the second converter is acquired according to a voltage of the destination side.

S303, according to the theoretical output voltage of the first converter and the theoretical input voltage of the second converter, the actual output voltage of the first converter in the first power supply cycle is set, wherein the first power supply cycle is a current cycle in which the source side transmits electric energy to the destination side.

The actual output voltage of the first converter in the first power supply cycle is an actual input voltage of the second converter in the first power supply cycle. Based on the actual output voltage of the first converter, the source side transmits electric energy to the destination side in the first power supply cycle through the first converter and the second converter.

The voltage of the source side and the voltage of the destination side may be detected and acquired in real time.

If the source side is the battery and the destination side is the power grid, the first converter may be a DC/DC converter and the second converter may be a DC/AC converter. A theoretical output voltage of the DC/DC converter is acquired according to a voltage of the battery; a theoretical input voltage of the DC/AC converter is acquired according to a voltage of the power grid; and according to the theoretical output voltage of the DC/DC converter and the theoretical input voltage of the DC/AC converter, an actual output voltage of the DC/DC converter in the first power supply cycle is set.

If the source side is the power grid and the destination side is the battery, the first converter may be a DC/AC converter and the second converter may be a DC/DC converter. A theoretical output voltage of the DC/AC converter is acquired according to a voltage of the power grid; a theoretical input voltage of the DC/DC converter is acquired according to a voltage of the battery; and according to the theoretical output voltage of the DC/AC converter and the theoretical input voltage of the DC/DC converter, an actual output voltage of the DC/AC converter in the first power supply cycle is set.

Figure 4:
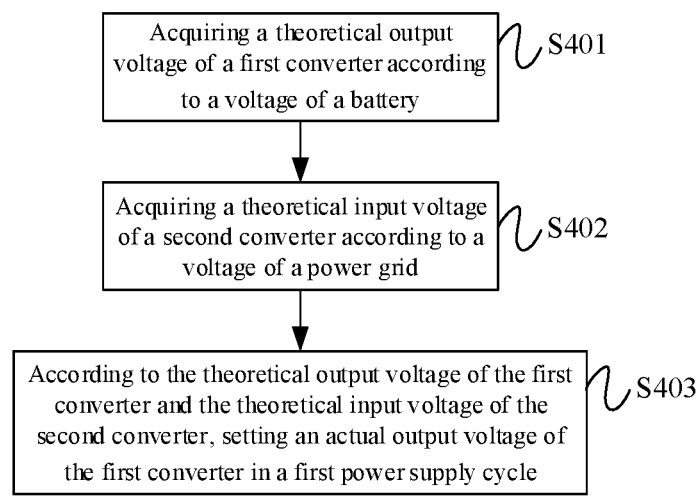
FIG. 4 illustrates a flow diagram of a method for controlling a power converter provided by embodiments of the application.

In a process of electric energy transmission, the source side transmits electric energy to the destination side through converters at two stages, the voltage of the source side and/or the voltage of the destination side vary in a certain range, and a converter at each stage has influence to the energy conversion efficiency. The theoretical output voltage of the first converter is acquired according to the voltage of the source side, the theoretical input voltage of the second converter is acquired according to the voltage of the destination side, and the actual output voltage of the first converter in the first power supply cycle is set according to the theoretical output voltage of the first converter and the theoretical input voltage of the second converter, so that the efficiency of electric energy transmission from the source side to the destination side through the converters at two stages is improved. FIG. 4 illustrates a flow diagram of a method for controlling a power converter provided by a second embodiment of the application. The embodiment is described in detail by taking V2G as an example. As shown in FIG. 4, the method for controlling a power converter may include the following steps.

S401, the theoretical output voltage of the first converter is acquired according to the voltage of the battery.

The first converter may specifically be a DC/DC converter, which may control a magnitude of an output voltage by changing a turn ratio of a transformer in the converter. The theoretical output voltage of the first converter may be a product of the voltage of the battery and the turn ratio of the first converter.

The theoretical output voltage of the first converter may be calculated according to the following expression (1):

$$Vb = Vbat \times n \quad (1)$$

wherein Vb is the theoretical output voltage of the first converter, Vbat is the voltage of the battery, and n is the turn ratio of the first converter. If the turn ratio of the first converter is 15:13, then $$Vb = \frac{15}{13} Vbat.$$

Optionally, according to a specific structure of the first converter, a function model of the voltage of the battery, the turn ratio of the first converter and the theoretical output voltage of the first converter is set, which is not limited thereto. For an isolated resonant DC/DC converter, the turn ratio of the converter represents a transformation ratio of a transformer in the isolated resonant DC/DC converter. The closer a ratio of the output voltage of the converter to the voltage of the battery is to the transformation ratio of the isolated resonant DC/DC converter, the higher the energy transmission efficiency of the isolated resonant DC/DC converter. That is, the closer the output voltage of the first converter is to the theoretical output voltage of the first converter, the higher the energy transmission efficiency of the first converter.

Specifically, acquiring the theoretical output voltage of the first converter includes acquiring the theoretical output voltage of the first converter according to the voltage of the battery and the turn ratio of the first converter.

S402, the theoretical input voltage of the second converter is acquired according to the voltage of the power grid.

The second converter may specifically be a DC/AC converter, and the theoretical input voltage of the second converter may be acquired according to the voltage of the power grid and a maximum modulation ratio of the second converter. The maximum modulation ratio is a ratio between a modulated wave peak value and a carrier wave peak value in PWM technology, and the modulated wave peak value may be a ratio of a peak voltage of the power grid to an input voltage of the second converter. The maximum modulation ratio of the second converter may be a maximum modulation ratio of the DC/AC converter.

Optionally, the function model of the voltage of the power grid, the maximum modulation ratio of the second converter and the theoretical input voltage of the second converter may be set according to a specific structure of the second converter, which is not limited thereto. For example, the theoretical input voltage of the second converter may be a product of a first summation and a first quotient. The first summation is a sum of the voltage of the power grid and a voltage error margin. The first quotient is a quotient of an efficiency conversion parameter and the maximum modulation ratio. The theoretical input voltage of the second converter may be calculated according to the following expression (2):

$$Vb = Vbat \times n \quad (2)$$

In this example, n in the expression (2) is the maximum modulation ratio of the second converter, and correspondingly, Vb is the theoretical input voltage of the second converter.

If the second converter is specifically a totem pole DC/AC converter, the maximum modulation ratio of the second converter may be a maximum modulation ratio of the topology of the totem pole DC/AC converter. The voltage error margin may specifically be a product of an AC side filter inductance of the totem pole DC/AC converter, a power frequency angular frequency of the totem pole DC/AC converter and an AC side maximum current of the totem pole DC/AC converter. The input voltage of the second converter should be larger than several times of an AC side voltage, and the closer the input voltage of the second converter is to the several times of the AC side voltage, the higher the energy transmission efficiency of the totem pole DC/AC converter. That is, the closer the input voltage of the second converter is to the theoretical input voltage of the second converter, the higher the energy transmission efficiency of the second converter.

S403, the actual output voltage of the first converter in the first power supply cycle is set according to the theoretical output voltage of the first converter and the theoretical input voltage of the second converter.

Alternatively, if a larger value of the theoretical output voltage of the first converter and the theoretical input voltage of the second converter is larger than a minimum operating voltage of the second converter and less than a maximum withstand voltage of the first converter and the second converter, the larger value is set as the actual output voltage of the first converter in the first power supply cycle. Specifically, the larger value of the theoretical output voltage of the first converter and the theoretical input voltage of the second converter may be set as a voltage of a DC bus between the first converter and the second converter.

The minimum operating voltage of the second converter is a minimum voltage supported by the second converter operating normally. The maximum withstand voltage of the first converter and the second converter is a maximum voltage supported by the first converter and the second converter operating normally.

By selecting the larger value of the theoretical output voltage of the first converter and the theoretical input voltage of the second converter and ensuring that the first converter and the second converter can operate normally, a higher energy transmission efficiency is achieved.

Alternatively, if the larger value of the theoretical output voltage of the first converter and the theoretical input voltage of the second converter is less than or equal to the minimum operating voltage of the second converter, the minimum operating voltage of the second converter is set as the actual output voltage of the first converter in the first power supply cycle.

When the larger value of the theoretical output voltage of the first converter and the theoretical input voltage of the second converter is less than or equal to the minimum operating voltage of the second converter, in order to improve the energy transmission efficiency as much as possible while ensuring safe and stable energy transmission between the battery and the power grid, the minimum operating voltage of the second converter is set as the actual output voltage of the converter in the first power supply cycle.

Alternatively, if the larger value of the theoretical output voltage of the first converter and the theoretical input voltage of the second converter is larger than or equal to the maximum withstand voltage of the first converter and the second converter, the maximum withstand voltage of the first converter and the second converter is set as the actual output voltage of the first converter in the first power supply cycle.

When the larger value of the theoretical output voltage of the first converter and the theoretical input voltage of the second converter is larger than or equal to the maximum withstand voltage of the first converter and the second converter, in order to improve the energy transmission efficiency as much as possible while ensuring safe and stable energy transmission between the battery and the power grid, the maximum withstand voltage of the first converter and the second converter is set as the actual output voltage of the first converter in the first power supply cycle.

In a process of setting the actual output voltage of the first converter in the first power supply cycle, if a difference between the set actual output voltage of the first converter in the first power supply cycle and an actual output voltage of the first converter in a previous power supply cycle is too large, the energy transmission between the battery and the power grid will be adversely affected, for example, the output voltage of the first converter may be overshoot in an adjustment process, which causes the output voltage of the first converter to exceed a withstand voltage of an energy transmission circuit between the battery and the power grid.

Furthermore, when setting the actual output voltage of the first converter in the first power supply cycle, it is necessary to consider an actual output voltage of the first converter in a second power supply cycle. The second power supply cycle is a previous cycle of the first power supply cycle.

If the larger value of the theoretical output voltage of the first converter and the theoretical input voltage of the second converter is larger than the minimum operating voltage of the second converter and less than the maximum withstand voltage of the first converter and the second converter, and an absolute value of a difference between the larger value and the actual output voltage of the first converter in the second power supply cycle is less than or equal to a first voltage threshold, the larger value is set as the actual output voltage of the first converter in the first power supply cycle.

The first voltage threshold is a threshold to determine whether there occurs a large voltage change. The difference between the larger value of the theoretical output voltage of the first converter and the theoretical input voltage of the second converter and the actual output voltage of the first converter in the second power supply cycle indicates a change amount of the output voltage of the first converter in the first power supply cycle and the second power supply cycle.

The absolute value of the difference between the larger value of the theoretical output voltage of the first converter and the theoretical input voltage of the second converter and the actual output voltage of the first converter in the second power supply cycle being less than or equal to the first voltage threshold indicates that a difference between the actual output voltage of the first converter in the first power supply cycle, which is set according to the larger value, and the actual output voltage of the first converter in the second power supply cycle is within an acceptable range, and the larger value may be directly set as the actual output voltage of the first converter in the first power supply cycle, so as to ensure safety of energy transmission between the battery and the power grid.

If the absolute value of the difference between the larger value of the theoretical output voltage of the first converter and the theoretical input voltage of the second converter and the actual output voltage of the first converter in the second power supply cycle is larger than the first voltage threshold, then the actual output voltage of the first converter in the first power supply cycle is set according to the actual output voltage of the first converter in the second power supply cycle and the first voltage threshold. That is, when the larger value is larger than the actual output voltage of the first converter in the second power supply cycle, a result of adding the first voltage threshold to the actual output voltage of the first converter in the second power supply cycle is taken as the actual output voltage of the first converter in the first power supply cycle; when the larger value is less than the actual output voltage of the first converter in the second power supply cycle, a result of subtracting the first voltage threshold from the actual output voltage of the first converter in the second power supply cycle is taken as the actual output voltage of the first converter in the first power supply cycle.

Figure 5:
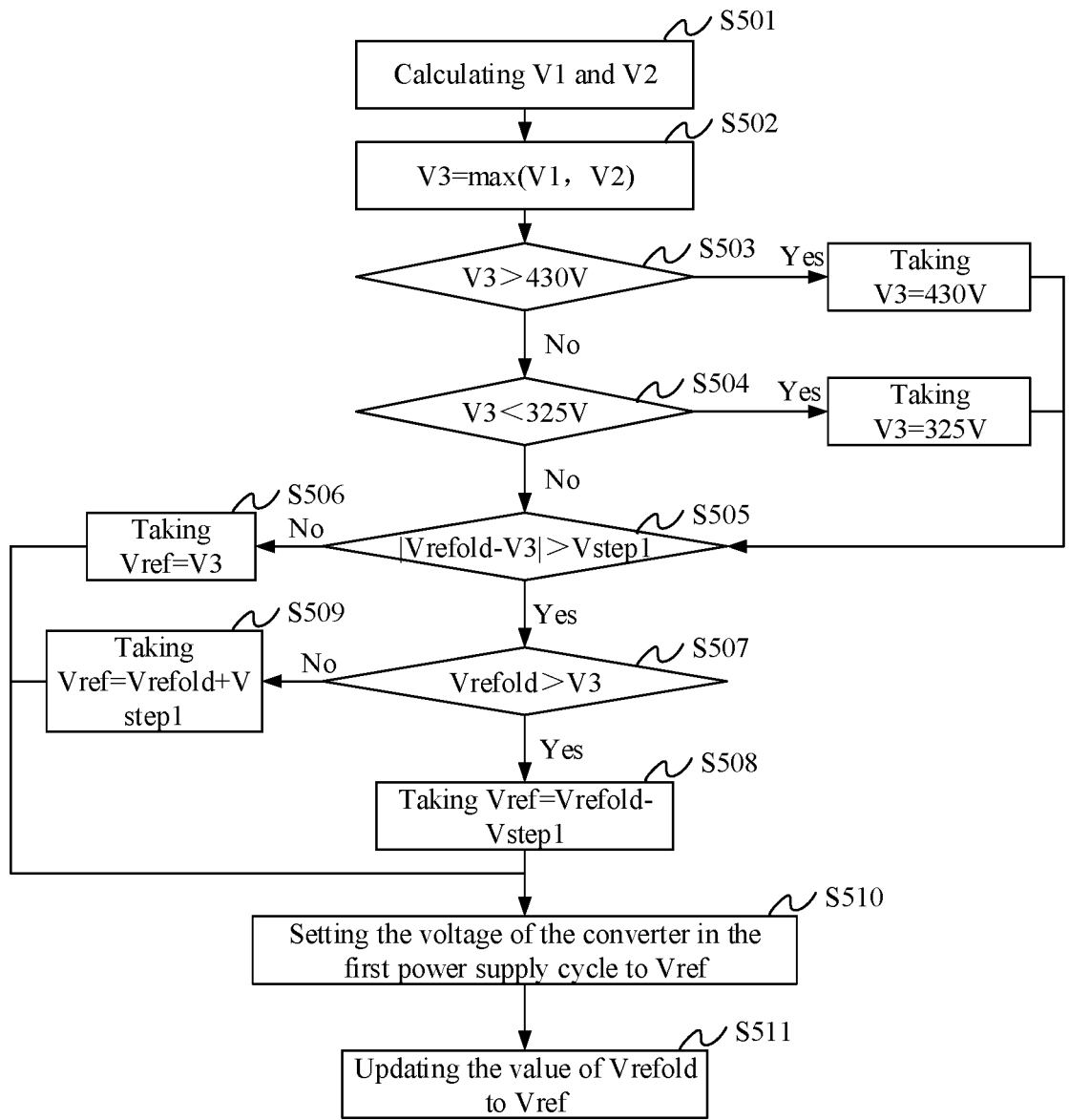
FIG. 5 illustrates a flow diagram of another method for controlling a power converter provided by embodiments of the application.

V2G is described in conjunction with a specific example below. FIG. 5 illustrates an example flow diagram of another method for controlling a power converter provided by the second embodiment of the application. In this example, an initial voltage is preset to 380V; the minimum operating voltage of the second converter is 325V; and the maximum withstand voltage of the first converter and the second converter is 430V.

As shown in FIG. 5, the method for controlling a power converter may include the following steps.

In S501, a theoretical output voltage V1 of the first converter and a theoretical input voltage V2 of the second converter are calculated.

In S502, a larger value of the theoretical output voltage V1 of the first converter and the theoretical input voltage V2 of the second converter is taken as V3. That is, V3=max (V1, V2), where max means taking a maximum value.

In S503, it is determined whether V3 is larger than a maximum withstand voltage 430V of the first converter and the second converter. If V3<430V, the method goes to S504; if V3>430V, V3 is set to 430V and the method goes to S505.

In S504, it is determined whether V3 is less than a minimum operating voltage 325V of the first converter. If V3>325V, the method goes to S505; if V3<325V, V3 is set to 325V and the method goes to S505.

In S505, it is determined whether an absolute value of a difference between an actual output voltage Vrefold of the first converter in the second power supply cycle and V3 is less than or equal to a first voltage threshold Vstep1. If |Vrefold−V3|≤Vstep1, the method goes to S506; if |Vrefold−V3|>Vstep1, the method goes to S507.

In S506, V3 is taken as Vref and the method goes to S510.

In S507, it is determined whether the actual output voltage Vrefold of the first converter in the second power supply cycle is larger than V3. If Vrefold>V3, the method goes to S508; if Vrefold V3, the method goes to S509.

In S508, (Vrefold−Vstep1) is taken as Vref and the method goes to S510.

In S509, (Vrefold+Vstep1) is taken as Vref and the method goes to S510.

In S510, the actual output voltage of the first converter in the first power supply cycle is set to Vref and the method goes to S511.

In step S511, the value of the actual output voltage Vrefold of the first converter in the second power supply cycle is updated to Vref. The Vrefold used in the next cycle is the Vref acquired in this cycle.

Table 1 shows energy transmission efficiencies of a solution in accordance with embodiments of the application and a solution with a fixed voltage under the same AC voltage and the same DC voltage. The AC voltage is the voltage of the source side and the DC voltage is the voltage of the destination side. Alternatively, the AC voltage is the voltage of the destination side and the DC voltage is the voltage of the source side. The fixed voltage is set to 400V.

TABLE 1

| DC voltage | AC voltage | Solution with a fixed voltage | Solution in accordance with embodiments of the application |
|---|---|---|---|
| 240 | 187 | 0.8658 | 0.900936 |
| 500 | 187 | 0.884078 | 0.90535 |
| 240 | 220 | 0.8757 | 0.890958 |
| 500 | 220 | 0.894187 | 0.9082 |
| 240 | 253 | 0.8577 | 0.8784 |
| 350 | 253 | 0.913927 | 0.935984 |
| 500 | 253 | 0.875807 | 0.91485 |

The unit of the DC voltage and the AC voltage in Table 1 is volt (that is, V). The solution with a fixed voltage represents energy transmission efficiencies obtained by adopting a fixed voltage method, and the solution in accordance with embodiments of the application represents energy transmission efficiencies obtained by adopting the solution in accordance with the embodiments of the application.

Figure 6:
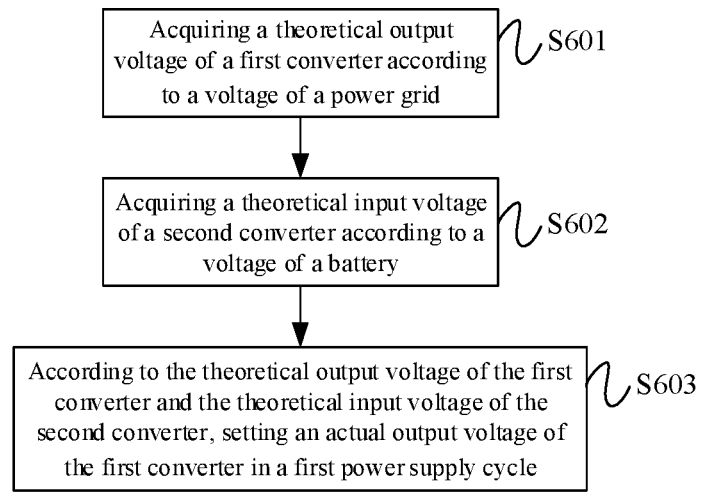
FIG. 6 illustrates a flow diagram of a method for controlling a power converter provided by embodiments of the application.

FIG. 6 illustrates a flow diagram of a method for controlling a power converter provided by a third embodiment of the application. As shown in FIG. 6, the method for controlling a power converter may include S601 to S603.

S601, the theoretical output voltage of the first converter is acquired according to the voltage of the power grid.

The first converter may specifically be a DC/AC converter, and specific contents of the DC/AC converter may refer to relevant descriptions in S402 of the second embodiment of the application, and will not be repeated.

S602, the theoretical input voltage of the second converter is acquired according to the voltage of the battery.

The second converter may specifically be a DC/DC converter, and specific contents of the DC/DC converter may refer to relevant descriptions in S401 of the second embodiment of the application, and will not be repeated.

S603, according to the theoretical output voltage of the first converter and the theoretical input voltage of the second converter, the actual output voltage of the first converter in the first power supply cycle is set.

It should be noted that the actual output voltage of the first converter in the first power supply cycle may be acquired in S603 by a comparison of the theoretical output voltage of the first converter with the theoretical input voltage of the second converter, a comparison of one of the theoretical output voltage of the first converter and the theoretical input voltage of the second converter with a minimum operating voltage of the first converter and the maximum withstand voltage of the first converter and the second converter, and a comparison of the actual output voltage of the first converter in the second power supply cycle, the theoretical output voltage of the first converter, the theoretical input voltage of the second converter, the minimum operating voltage of the first converter, and the maximum withstand voltage of the first converter and the second converter.

Alternatively, if the larger value of the theoretical output voltage of the first converter and the theoretical input voltage of the second converter is larger than the minimum operating voltage of the first converter and less than the maximum withstand voltage of the first converter and the second converter, the larger value is set as the actual output voltage of the first converter in the first power supply cycle.

The minimum operating voltage of the first converter is a minimum voltage supported by the first converter operating normally. The maximum withstand voltage of the first converter and the second converter is the maximum voltage supported by the first converter and the second converter operating normally.

Selection of the larger value of the theoretical output voltage of the first converter and the theoretical input voltage of the second converter also needs to ensure that the first converter and the second converter can operate normally, which can achieve a higher energy transmission efficiency of the whole system.

Alternatively, if the larger value of the theoretical output voltage of the first converter and the theoretical input voltage of the second converter is less than or equal to the minimum operating voltage of the second converter, the minimum operating voltage of the second converter is set as the actual output voltage of the first converter in the first power supply cycle.

When the larger value of the theoretical output voltage of the first converter and the theoretical input voltage of the second converter is less than or equal to the minimum operating voltage of the second converter, in order to improve the energy transmission efficiency as much as possible while ensuring the safe and stable energy transmission between the battery and the power grid, the minimum operating voltage of the second converter is set as the actual output voltage of the first converter in the first power supply cycle.

Alternatively, if the larger value of the theoretical output voltage of the first converter and the theoretical input voltage of the second converter is larger than or equal to the maximum withstand voltage of the first converter and the second converter, the maximum withstand voltage of the first converter and the second converter is set as the actual output voltage of the first converter in the first power supply cycle.

When the larger value of the theoretical output voltage of the first converter and the theoretical input voltage of the second converter is larger than or equal to the maximum withstand voltage of the first converter and the second converter, in order to improve the energy transmission efficiency as much as possible while ensuring the safe and stable energy transmission between the battery and the power grid, the maximum withstand voltage of the first converter and the second converter is set as the actual output voltage of the first converter in the first power supply cycle.

Furthermore, when setting the actual output voltage of the first converter in the first power supply cycle, it is necessary to consider the actual output voltage of the first converter in the second power supply cycle. The second power supply cycle is the previous cycle of the first power supply cycle.

If the larger value of the theoretical output voltage of the first converter and the theoretical input voltage of the second converter is larger than the minimum operating voltage of the second converter and less than the maximum withstand voltage of the first converter and the second converter, and the absolute value of the difference between the larger value and the actual output voltage of the first converter in the second power supply cycle is less than or equal to the first voltage threshold, the larger value is set as the actual output voltage of the first converter in the first power supply cycle.

In the process of setting the actual output voltage of the first converter in the first power supply cycle, if the difference between the set actual output voltage of the first converter in the first power supply cycle and the actual output voltage of the first converter in the previous power supply cycle is too large, the energy transmission between the battery and the power grid will be adversely affected, for example, the output voltage of the first converter may be overshoot in the adjustment process, which causes the output voltage of the first converter to exceed the withstand voltage value of the energy transmission circuit between the battery and the power grid.

The first voltage threshold is the threshold to determine whether there occurs a large voltage change. The difference between the larger value of the theoretical output voltage of the first converter and the theoretical input voltage of the second converter and the actual output voltage of the first converter in the second power supply cycle indicates that the change amount of the output voltage of the first converter in the first power supply cycle and the second power supply cycle.

The absolute value of the difference between the larger value of the theoretical output voltage of the first converter and the theoretical input voltage of the second converter and the actual output voltage of the first converter in the second power supply cycle being less than or equal to the first voltage threshold indicates that the difference between the actual output voltage of the first converter in the first power supply period, which is set according to the larger value, and the actual output voltage of the first converter in the second power supply cycle is within the acceptable range and the larger value may be set directly as the actual output voltage of the first converter in the first power supply cycle, so as to ensure the safety of energy transmission between the battery and the power grid.

If the absolute value of the difference between the larger value of the theoretical output voltage of the first converter and the theoretical input voltage of the second converter and the actual output voltage of the first converter in the second power supply cycle is larger than the first voltage threshold, the actual output voltage of the first converter in the first power supply cycle is set according to the actual output voltage of the first converter in the second power supply cycle and the first voltage threshold. That is, when the larger value is larger than the actual output voltage of the first converter in the second power supply cycle, the result of adding the first voltage threshold to the actual output voltage of the first converter in the second power supply cycle is taken as the actual output voltage of the first converter in the first power supply cycle; when the larger value is less than the actual output voltage of the first converter in the second power supply cycle, the result of subtracting the first voltage threshold from the actual output voltage of the first converter in the second power supply cycle is taken as the actual output voltage of the first converter in the first power supply cycle.

Figure 7:
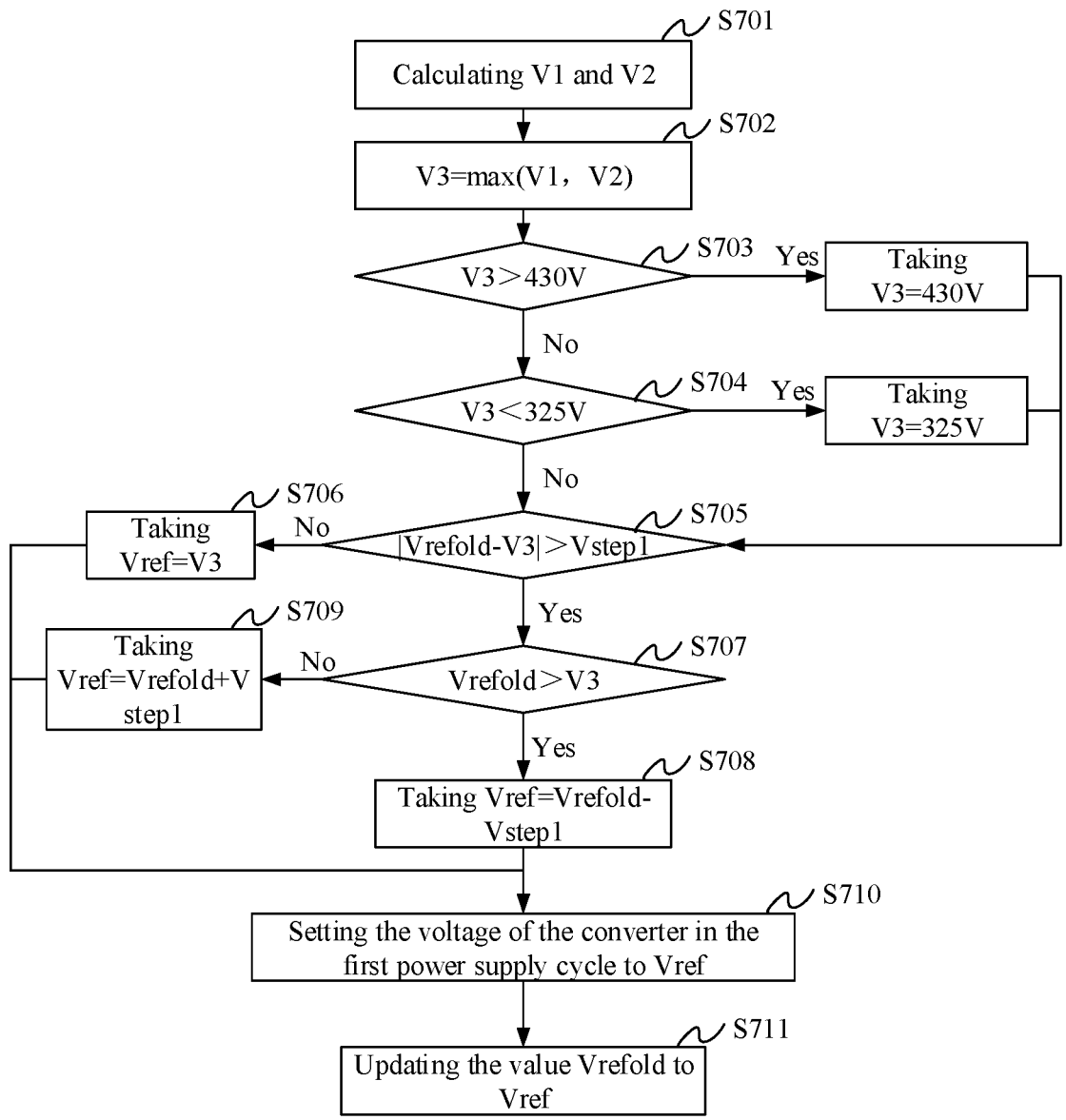
FIG. 7 illustrates a flow diagram of yet another method for controlling a power converter provided by embodiments of the application.

FIG. 7 illustrates an example flow diagram of a method for controlling a power converter provided by a third embodiment of the application. As shown in FIG. 7, the method for controlling a power converter may include S701 to S711.

In S701, the theoretical output voltage V1 of the first converter and the theoretical input voltage V2 of the second converter are calculated.

In S702, the larger value of the theoretical output voltage V1 of the first converter and the theoretical input voltage V2 of the second converter is taken as V3. That is, V3=max (V1, V2), where max means taking a maximum value.

In S703, it is determined whether V3 is larger than the maximum withstand voltage 430V of the first converter and the second converter. If V3<430V, the method goes to S704; if V3>430V, V3 is set to 430V and the method goes to S705.

In S704, it is determined whether V3 is less than the minimum operating voltage 325V of the first converter. If V3>325V, the method goes to S705; if V3<325V, V3 is set to 325V and the method goes to S705.

In S705, it is determined whether the absolute value of the difference between the actual output voltage Vrefold of the first converter in the second power supply cycle and V3 is less than or equal to a second voltage threshold Vstep2. If |Vrefold−V3|≤Vstep2, the method goes to S706; if |Vrefold−V3|>Vstep2, the method goes to S707.

In S706, V3 is taken as Vref and the method goes to S710.

In S707, it is determined whether the actual output voltage Vrefold of the first converter in the second power supply cycle is larger than V3. If Vrefold>V3, the method goes to S708; if Vrefold≤V3, the method goes to S709.

In S708, (Vrefold−Vstep2) is taken as Vref and the method goes to S710.

In S709, (Vrefold+Vstep2) is taken as Vref and the method goes to S710.

In S710, the actual output voltage of the first converter in the first power supply cycle is set to Vref and the method goes to S701.

In step S711, the value of the actual output voltage Vrefold of the first converter in the second supply cycle is updated to Vref. The Vrefold used in the next cycle is the Vref acquired in this cycle.

Figure 8:
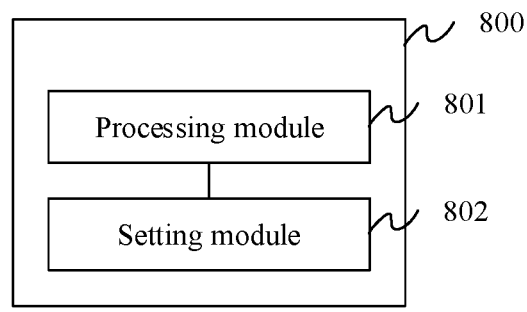
FIG. 8 illustrates a diagram of an apparatus for controlling a power converter provided by embodiments of the application.

FIG. 8 illustrates a structural diagram of an apparatus for controlling a power converter provided by embodiments of the application. As shown in FIG. 8, the apparatus 800 for controlling a power converter may include an acquisition unit 801 and a processing unit 802 to implement the methods of the above embodiments.

The acquisition unit 801 may be configured for acquiring the theoretical output voltage of the first converter according to the voltage of the source side, and the acquisition unit 801 may also be configured for acquiring the theoretical input voltage of the second converter according to the voltage of the destination side.

The source side is one of the battery and the power grid. The destination side is the other of the battery and the power grid. The source side transmits electric energy to the destination side through the first converter and the second converter in turn.

The processing unit 802 may be configured for setting the actual output voltage of the first converter in the first power supply cycle according to the theoretical output voltage of the first converter and the theoretical input voltage of the second converter.

The first power supply cycle is the current cycle in which the source side transmits electric energy to the destination side.

By comprehensively considering the theoretical output voltage of the first converter and the theoretical input voltage of the second converter, the actual output voltage of the first converter in the current cycle is set. The actual output voltage of the first converter in the current cycle can be adjusted in time according to the voltage of the source side and the voltage of the destination side, and the control of the power converter improves the energy transmission efficiency between the source side and the destination side.

Moreover, as the energy transmission efficiency between the source side and the destination side is improved, the problem of energy consumption in the form of heat due to the conversion failure caused by the low energy transmission efficiency is avoided, and thus the adverse effect of heat consumption on the components of the first converter and the components of the second converter is avoided, which prolongs the working life of the first converter and the second converter and improves the performance of the first converter and the second converter.

The following description is provided taking an example in which the source side is the battery and the destination side is the power grid.

In a realizable implementation, the processing unit 802 is configured for setting the larger value of the theoretical output voltage of the first converter and the theoretical input voltage of the second converter as the actual output voltage of the first converter in the first power supply cycle if the larger value is larger than the minimum operating voltage of the second converter and less than the maximum withstand voltage of the first converter and the second converter.

In a realizable implementation, the processing unit 802 is configured for, if the larger value of the theoretical output voltage of the first converter and the theoretical input voltage of the second converter is larger than the minimum operating voltage of the second converter and less than the maximum withstand voltage of the first converter and the second converter, and the absolute value of the difference between the larger value and the actual output voltage of the first converter in the second power supply cycle is less than or equal to the first voltage threshold, setting the larger value as the actual output voltage of the first converter in the first power supply cycle, wherein the second power supply cycle is the previous cycle of the first power supply cycle.

In a realizable implementation, the processing unit 802 is configured for, if the larger value of the theoretical output voltage of the first converter and the theoretical input voltage of the second converter is larger than the minimum operating voltage of the second converter and less than the maximum withstand voltage of the first converter and the second converter, and the absolute value of the difference between the larger value and the actual output voltage of the first converter in the second power supply cycle is larger than the first voltage threshold, setting the actual output voltage of the first converter in the first power supply cycle according to the actual output voltage of the first converter in the second power supply cycle and the first voltage threshold, wherein the second power supply cycle is the previous cycle of the first power supply cycle.

In a realizable implementation, the processing unit 802 is configured for, if the larger value of the theoretical output voltage of the first converter and the theoretical input voltage of the second converter is less than or equal to the minimum operating voltage of the second converter, setting the minimum operating voltage of the second converter to the actual output voltage of the first converter in the first power supply cycle.

In a realizable implementation, the processing unit 802 is configured for, if the larger value of the theoretical output voltage of the first converter and the theoretical input voltage of the second converter is larger than or equal to the maximum withstand voltage of the first converter and the second converter, setting the maximum withstand voltage of the first converter and the second converter as the actual output voltage of the first converter in the first power supply cycle.

In a realizable implementation, the acquisition unit 801 is configured for acquiring the theoretical output voltage of the first converter according to the voltage of the battery and the turn ratio of the first converter; the acquisition unit 801 is also configured for acquiring the theoretical input voltage of the second converter according to the voltage of the power grid and the maximum modulation ratio of the second converter.

The following description is made by taking an example in which the source side is the power grid and the destination side is the battery.

In a realizable implementation, the processing unit 802 is configured for, if the larger value of the theoretical output voltage of the first converter and the theoretical input voltage of the second converter is larger than the minimum operating voltage of the first converter and less than the maximum withstand voltage of the first converter and the second converter, setting the larger value as the actual output voltage of the first converter in the first power supply cycle.

In a realizable implementation, the processing unit 802 is further configured for, if the larger value of the theoretical output voltage of the first converter and the theoretical input voltage of the second converter is larger than the minimum operating voltage of the first converter and less than the maximum withstand voltage of the first converter and the second converter, and the absolute value of the difference between the larger value and the actual output voltage of the first converter in the second power supply cycle is less than or equal to the second voltage threshold, setting the larger value as the actual output voltage of the first converter in the first power supply cycle, wherein the second power supply cycle is the previous cycle of the first power supply cycle.

In a realizable implementation, the processing unit 802 is further configured for, if the larger value of the theoretical output voltage of the first converter and the theoretical input voltage of the second converter is less than or equal to the minimum operating voltage of the first converter, setting the minimum operating voltage of the first converter as the actual output voltage of the first converter in the first power supply cycle.

In a realizable implementation, the processing unit 802 is further configured for, if the larger value of the theoretical output voltage of the first converter and the theoretical input voltage of the second converter is larger than or equal to the maximum withstand voltage of the first converter and the second converter, setting the maximum withstand voltage of the first converter and the second converter as the actual output voltage of the first converter in the first power supply cycle.

In a realizable implementation, the processing unit 802 is further configured for acquirin the theoretical output voltage of the first converter according to the voltage of the power grid and the maximum modulation ratio of the first converter; acquiring the theoretical input voltage of the second converter according to the voltage of the destination side includes acquiring the theoretical input voltage of the second converter according to the voltage of the battery and the turn ratio of the second converter.

It should be understood that specific implementations of the apparatus for controlling a power converter and beneficial effects thereof may be seen in relevant descriptions in the method embodiments, and will not be repeated for brevity.

Embodiments of the application also provides a system for controlling a power converter, the system including an acquisition unit and a processing unit for implementing the methods of the above embodiments.

Figure 9:
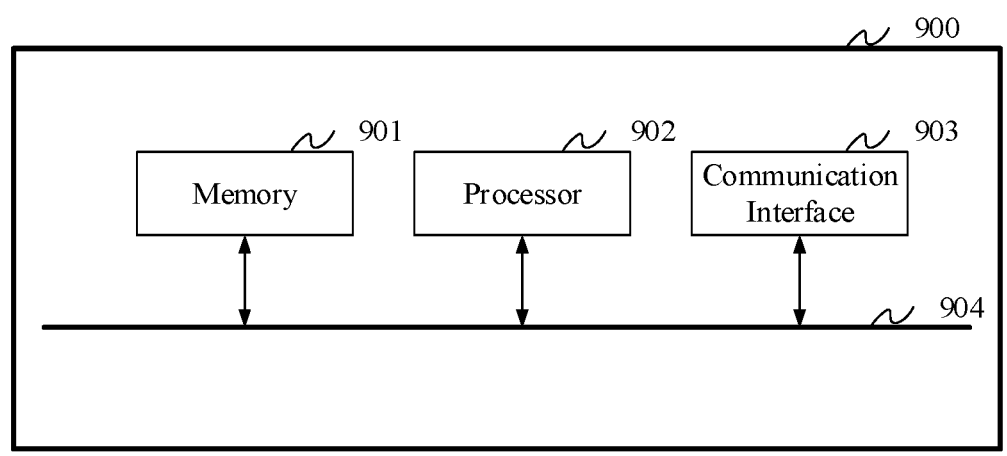
FIG. 9 illustrates a diagram of an apparatus for controlling a power converter provided by embodiments of the application.

FIG. 9 illustrates a schematic diagram of a hardware structure of an apparatus for controlling a power converter provided by embodiments of the application. As shown in FIG. 9, the apparatus 900 for controlling a power converter includes a memory 901 for storing instructions and a processor 902 for reading the instructions and implementing the aforementioned methods based on the instructions.

In one example, the processor 902 may be a Central Processing Unit (CPU) or an Application Specific Integrated Circuit (ASIC), or may be configured as one or more integrated circuits to implement the embodiments of the application.

The memory 901 may include a mass memory for data or instructions. For example instead of limitation, the memory 901 may include a floppy disk drive, a flash memory, an optical disk, a magneto-optical disk, a magnetic tape, or an Universal Serial Bus (USB) drive, or a combination of two or more of them. Where appropriate, the memory 901 may include removable or non-removable (or fixed) media. Where appropriate, the memory 901 may be internal or external of the apparatus 900 for controlling a power converter. In a specific embodiment, the memory 901 is a non-volatile solid-state memory. In a specific embodiment, the memory 901 includes a Read Only Memory (ROM). If appropriate, the ROM may be a mask programmed ROM, a programmable ROM (PROM), an erasable PROM (EPROM), an electrically erasable PROM (EEPROM), an electrically alterable ROM (EAROM) or a flash memory, or a combination of two or more of them.

In an example for controlling a power converter, the apparatus 900 for controlling a power converter may also include a communication interface 903 and a bus 904. As shown in FIG. 9, the memory 901, the processor 902 and the communication interface 903 are connected with each other via the bus 904 and thus to communicate with each other.

The communication interface 903 is mainly used for realizing communication between modules, devices, units and/or devices in the embodiments of the application. An input device and/or output device may also be connected via the communication interface 903.

The bus 904 includes hardware, software, or both of them that couple components of the apparatus 900 for controlling a power converter with each other. For example instead of limitation, the bus 904 may include an Accelerated Graphics Port (AGP) or another graphics bus, an Enhanced Industry Standard Architecture (EISA) bus, a Front Side Bus (FSB), a HyperTransport (HT) interconnection, an Industry Standard Architecture (ISA) bus, an unlimited bandwidth interconnect, a low pin count bus, a memory bus, a Micro Channel Architecture (MCA) bus, a Peripheral Component Interconnect (PCI) bus, a PCI Express (PCI-X) bus, a Serial Advanced Technology Attachment (SATA) bus, a Video Electronics Standards Association local (VLB) bus or other suitable buses, or a combination of two or more of them. Where appropriate, the bus 904 may include one or more buses. Although specific buses are described in the embodiments of the application, the application covers any suitable buses or interconnects.

Embodiments of the application also provide a computer readable storage medium storing programs or instructions thereon, wherein the programs or instructions when executed by a processor, may implement the methods for controlling a power converter in the above embodiments.

It should be clear that all the embodiments in the description are described in a progressive manner, and the same or similar parts of the embodiments may be referred to each other. Each embodiment focuses on differences from other embodiments. For apparatus embodiments, device embodiments and computer readable storage medium embodiments, relevant contents may be seen in the descriptions of the method embodiments. The application is not limited to the specific steps and structures described above and shown in the figures. Those skilled in the art can make various changes, modifications and additions, or change the order of steps after understanding the spirit of the application. Moreover, for sake of brevity, a detailed description of known methods and techniques is omitted here.

It should be understood by those skilled in the art that the above embodiments are exemplary rather than restrictive. Different technical features appearing in different embodiments may be combined to obtain beneficial effects. On the basis of studying the drawings, the description and the claims, those skilled in the art should be able to understand and implement other variations of the disclosed embodiments. In the claims, the term "comprising" does not exclude other devices or steps; the quantifier "a" does not exclude multiple; the terms "first" and "second" are used to denote names rather than any particular order. Any reference number in the claim shall not be interpreted as limiting the protection scope thereof. The functions of multiple parts appearing in the claims can be realized by a single hardware or software module. The appearance of certain technical features in different dependent claims does not mean that these technical features cannot be combined to obtain beneficial effects.

What is claimed is:

1. A method for controlling a power converter, comprising:
  acquiring a theoretical output voltage of a first converter according to a voltage of a source side, wherein the source side is one of a battery and a power grid;
  acquiring a theoretical input voltage of a second converter according to a voltage of a destination side, wherein the destination side is the other of the battery and the power grid, and the source side transmits electric energy to the destination side through the first converter and the second converter in turn; and
  setting an actual output voltage of the first converter in a first power supply cycle according to the theoretical output voltage of the first converter and the theoretical input voltage of the second converter, wherein the first power supply cycle is a current cycle in which the source side transmits electric energy to the destination side,
  wherein when the source side is the battery and the destination side is the power grid, the setting an actual output voltage of the first converter in a first power supply cycle according to the theoretical output voltage of the first converter and the theoretical input voltage of the second converter comprises:
  under a condition that a larger value of the theoretical output voltage of the first converter and the theoretical input voltage of the second converter is larger than a minimum operating voltage of the second converter and less than a maximum withstand voltage of the first converter and the second converter, and an absolute value of a difference between the larger value and an actual output voltage of the first converter in a second power supply cycle is less than or equal to a first voltage threshold, setting the larger value as the actual output voltage of the first converter in the first power supply cycle, wherein the second power supply cycle is a previous cycle of the first power supply cycle,
  wherein the acquiring a theoretical output voltage of a first converter according to a voltage of a source side comprises:
  acquiring the theoretical output voltage of the first converter according to a voltage of the battery and a turn ratio of the first converter; and wherein
  the acquiring a theoretical input voltage of a second converter according to a voltage of a destination side comprises:
  acquiring the theoretical input voltage of the second converter according to a voltage of the power grid and a maximum modulation ratio of the second converter.

2. The method of claim 1, wherein the setting an actual output voltage of the first converter in a first power supply cycle according to the theoretical output voltage of the first converter and the theoretical input voltage of the second converter comprises:
  under a condition that the larger value of the theoretical output voltage of the first converter and the theoretical input voltage of the second converter is larger than the minimum operating voltage of the second converter and less than the maximum withstand voltage of the first converter and the second converter, and the absolute value of the difference between the larger value and the actual output voltage of the first converter in the second power supply cycle is larger than the first voltage threshold, setting the actual output voltage of the first converter in the first power supply cycle according to the actual output voltage of the first converter in the second power supply cycle and the first voltage threshold, wherein the second power supply cycle is the previous cycle of the first power supply cycle.

3. The method of claim 1, further comprising:
  under a condition that the larger value of the theoretical output voltage of the first converter and the theoretical input voltage of the second converter is less than or equal to the minimum operating voltage of the second converter, setting the minimum operating voltage of the second converter as the actual output voltage of the first converter in the first power supply cycle.

4. The method of claim 1, further comprising:
  under a condition that the larger value of the theoretical output voltage of the first converter and the theoretical input voltage of the second converter is larger than or equal to the maximum withstand voltage of the first converter and the second converter, setting the maximum withstand voltage of the first converter and the second converter as the actual output voltage of the first converter in the first power supply cycle.

5. A non-transitory computer readable storage medium storing programs or instructions thereon, wherein the programs or instructions when executed by a processor, cause the processor to implement the method for controlling the power converter of claim 1.

6. An apparatus for controlling a power converter, comprising:
  an acquisition unit configured for acquiring a theoretical output voltage of a first converter according to a voltage of a source side and further for acquiring a theoretical input voltage of a second converter according to a voltage of a destination side, wherein the source side is one of a battery and a power grid, the destination side is the other of the battery and the power grid, and the source side transmits electric energy to the destination side through the first converter and the second converter in turn; and
  a processing unit configured for setting an actual output voltage of the first converter in a first power supply cycle according to the theoretical output voltage of the first converter and the theoretical input voltage of the second converter, wherein the first power supply cycle is a current cycle in which the source side transmits electric energy to the destination side,
  wherein when the source side is the battery and the destination side is the power grid, the processing unit is further configured for:
  under a condition that a larger value of the theoretical output voltage of the first converter and the theoretical input voltage of the second converter is larger than a minimum operating voltage of the second converter and less than a maximum withstand voltage of the first converter and the second converter, and an absolute value of a difference between the larger value and an actual output voltage of the first converter in a second power supply cycle is less than or equal to a first voltage threshold, setting the larger value as the actual output voltage of the first converter in the first power supply cycle, wherein the second power supply cycle is a previous cycle of the first power supply cycle,
  wherein the acquiring a theoretical output voltage of a first converter according to a voltage of a source side comprises:
  acquiring the theoretical output voltage of the first converter according to a voltage of the battery and a turn ratio of the first converter; and wherein the acquiring a theoretical input voltage of a second converter according to a voltage of a destination side comprises:
acquiring the theoretical input voltage of the second converter according to a voltage of the power grid and a maximum modulation ratio of the second converter.

7. The apparatus of claim 6, wherein the processing unit is further configured for:
under a condition that the larger value of the theoretical output voltage of the first converter and the theoretical input voltage of the second converter is larger than the minimum operating voltage of the second converter and less than the maximum withstand voltage of the first converter and the second converter, and the absolute value of the difference between the larger value and the actual output voltage of the first converter in the second power supply cycle is larger than the first voltage threshold, setting the actual output voltage of the first converter in the first power supply cycle according to the actual output voltage of the first converter in the second power supply cycle and the first voltage threshold, wherein the second power supply cycle is the previous cycle of the first power supply cycle.

8. The apparatus of claim 6, wherein the processing unit is further configured for:
under a condition that the larger value of the theoretical output voltage of the first converter and the theoretical input voltage of the second converter is less than or equal to the minimum operating voltage of the second converter, setting the minimum operating voltage of the second converter as the actual output voltage of the first converter in the first power supply cycle.

9. The apparatus of claim 6, wherein the processing unit is further configured for:
under a condition that the larger value of the theoretical output voltage of the first converter and the theoretical input voltage of the second converter is larger than or equal to the maximum withstand voltage of the first converter and the second converter, setting the maximum withstand voltage of the first converter and the second converter as the actual output voltage of the first converter in the first power supply cycle.

10. A method for controlling a power converter, comprising:
acquiring a theoretical output voltage of a first converter according to a voltage of a source side, wherein the source side is one of a battery and a power grid;
acquiring a theoretical input voltage of a second converter according to a voltage of a destination side, wherein the destination side is the other of the battery and the power grid, and the source side transmits electric energy to the destination side through the first converter and the second converter in turn; and
setting an actual output voltage of the first converter in a first power supply cycle according to the theoretical output voltage of the first converter and the theoretical input voltage of the second converter, wherein the first power supply cycle is a current cycle in which the source side transmits electric energy to the destination side,
wherein when the source side is the power grid and the destination side is the battery, the setting an actual output voltage of the first converter in a first power supply cycle according to the theoretical output voltage of the first converter and the theoretical input voltage of the second converter comprises:
under a condition that a larger value of the theoretical output voltage of the first converter and the theoretical input voltage of the second converter is larger than a minimum operating voltage of the first converter and less than a maximum withstand voltage of the first converter and the second converter, and an absolute value of a difference between the larger value and an actual output voltage of the first converter in a second power supply cycle is less than or equal to a first voltage threshold, setting the larger value as the actual output voltage of the first converter in the first power supply cycle, wherein the second power supply cycle is a previous cycle of the first power supply cycle,
wherein the acquiring a theoretical output voltage of a first converter according to a voltage of a source side comprises:
acquiring the theoretical output voltage of the first converter according to a voltage of the power grid and a maximum modulation ratio of the first converter; and wherein
the acquiring a theoretical input voltage of a second converter according to a voltage of a destination side comprises:
acquiring the theoretical input voltage of the second converter according to a voltage of the battery and a turn ratio of the second converter.

11. The method of claim 10, wherein the setting an actual output voltage of the first converter in a first power supply cycle according to the theoretical output voltage of the first converter and the theoretical input voltage of the second converter comprises:
under a condition that the larger value of the theoretical output voltage of the first converter and the theoretical input voltage of the second converter is larger than the minimum operating voltage of the first converter and less than the maximum withstand voltage of the first converter and the second converter, and the absolute value of the difference between the larger value and the actual output voltage of the first converter in the second power supply cycle is larger than the first voltage threshold, setting the actual output voltage of the first converter in the first power supply cycle according to the actual output voltage of the first converter in the second power supply cycle and the first voltage threshold, wherein the second power supply cycle is the previous cycle of the first power supply cycle.

12. The method of claim 10, further comprising:
under a condition that the larger value of the theoretical output voltage of the first converter and the theoretical input voltage of the second converter is less than or equal to the minimum operating voltage of the first converter, setting the minimum operating voltage of the first converter as the actual output voltage of the first converter in the first power supply cycle.

13. The method of claim 10, further comprising:
under a condition that the larger value of the theoretical output voltage of the first converter and the theoretical input voltage of the second converter is larger than or equal to the maximum withstand voltage of the first converter and the second converter, setting the maximum withstand voltage of the first converter and the second converter as the actual output voltage of the first converter in the first power supply cycle.

* * * * *